(No Model.) 3 Sheets—Sheet 1.

H. AMUNDSON & F. J. HENRICHSEN.
SEED SOWER.

No. 321,879. Patented July 7, 1885.

Witnesses:
E. G. Somers
R. Platz

Inventors
Hans Amundson
Frederick J. Henrichsen
By Stout & Underwood
Attorneys.

(No Model.) 3 Sheets—Sheet 2.

H. AMUNDSON & F. J. HENRICHSEN.
SEED SOWER.

No. 321,879. Patented July 7, 1885.

Witnesses:
E. G. Siemens
R. Platz

Inventors
Hans Amundson
Frederick J. Henrichsen
By Stout & Underwood
Attorneys.

(No Model.) 3 Sheets—Sheet 3.
H. AMUNDSON & F. J. HENRICHSEN.
SEED SOWER.

No. 321,879. Patented July 7, 1885.

Witnesses:
E. G. Somers
R. Platz

Inventors
Hans Amundson
Frederick J. Henrichsen
By Stout & Underwood
Attorneys.

UNITED STATES PATENT OFFICE.

HANS AMUNDSON AND FREDERICK J. HENRICHSEN, OF RACINE, WISCONSIN.

SEED-SOWER.

SPECIFICATION forming part of Letters Patent No. 321,879, dated July 7, 1885.

Application filed February 9, 1885. (No model.)

*To all whom it may concern:*

Be it known that we, HANS AMUNDSON and FREDERICK HENRICHSEN, of Racine, in the county of Racine, and in the State of Wisconsin, have invented certain new and useful Improvements in Seed-Sowers; and we do hereby declare that the following is a full, clear, and exact description thereof.

Our invention relates to force feed-sowers, and will be fully described hereinafter.

Figure 1:
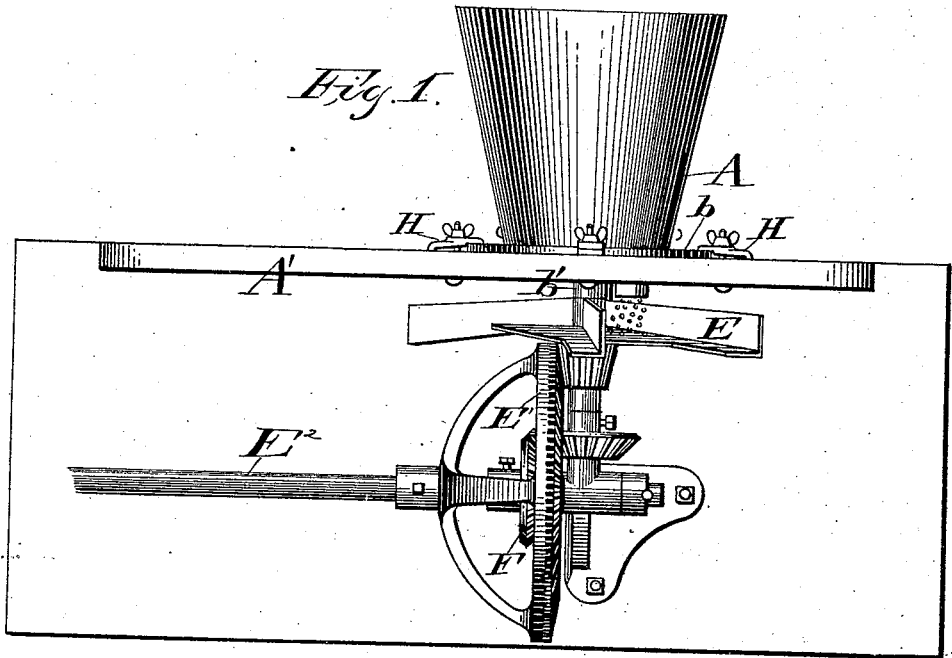
Figure 2:
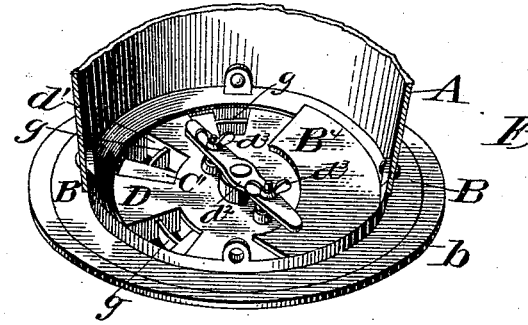
Figure 3:
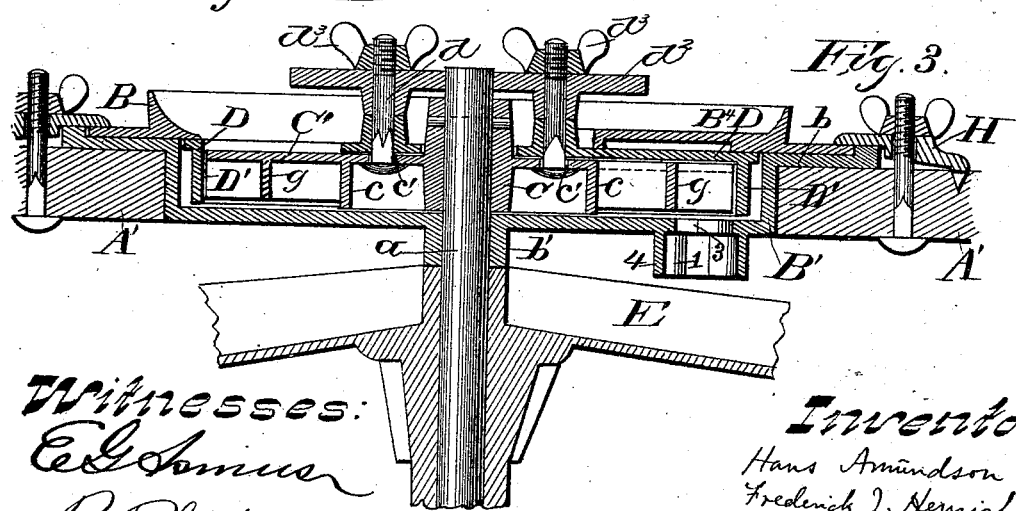
Figure 4:
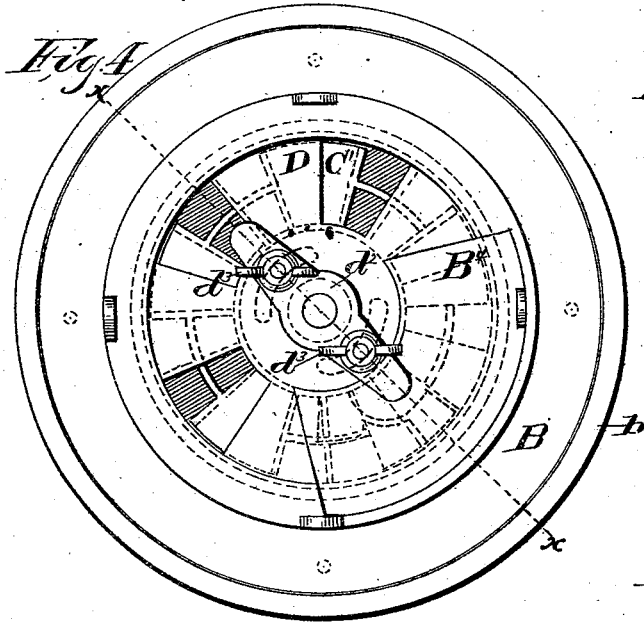
Figure 5:
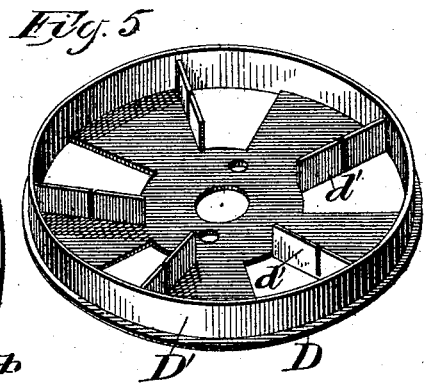
Figure 7:
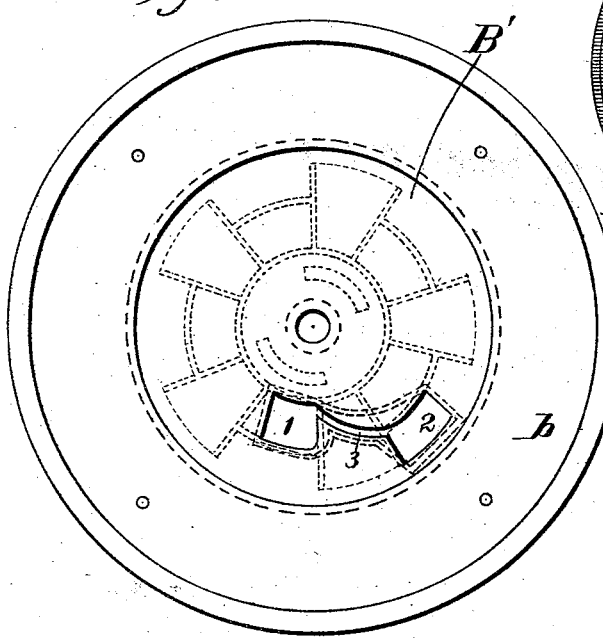
Figure 6:
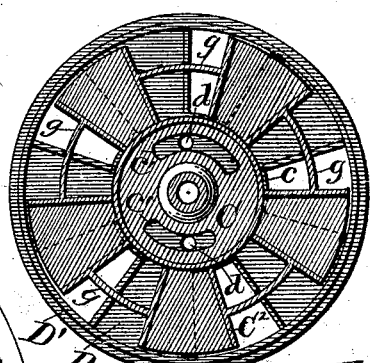
Figure 8:
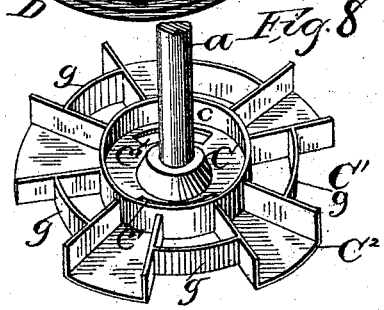
Figure 9:
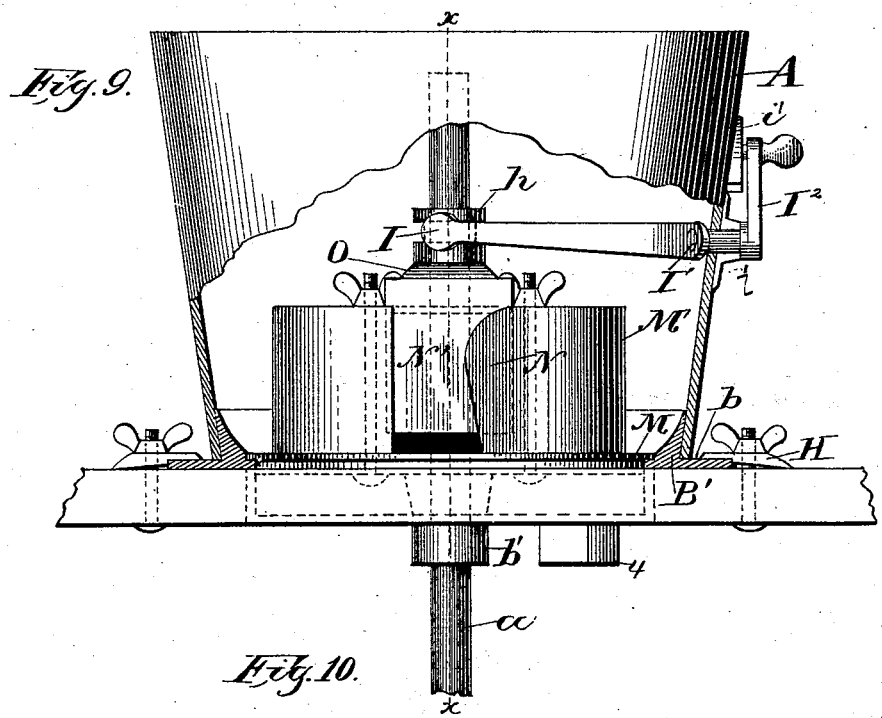
Figure 10:
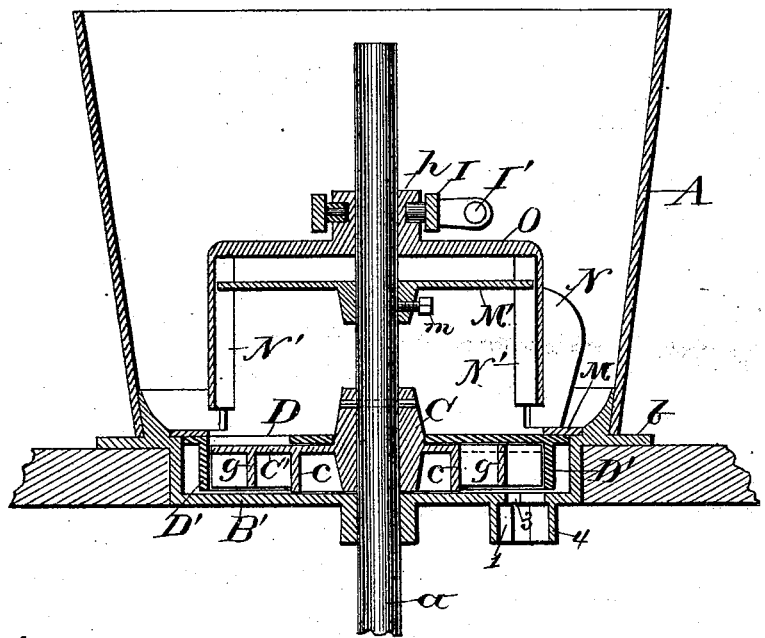

In the drawings, Figure 1 is a rear view of one form of our invention. Fig. 2 is a perspective view of the bottom of the hopper. Fig. 3 is a section on line $x\,x$, Fig. 4. Fig. 4 is plan view of our sower. Fig. 5 is a perspective view of a gage-plate. Fig. 6 is a bottom view of the force-wheel and its gage-plate. Fig. 7 is a plan view of the cup that forms the bottom of the hopper, with the force-wheel and gage-plate in dotted lines. Fig. 8 is a perspective view of the force-wheel inverted. Fig. 9 is a side view of another form of our invention, with a portion of the hopper broken away; and Fig. 10 is a section on line $x\,x$ of Fig. 9.

A is the hopper, the lower rim of which is secured to an annulus, B, that in turn rests in the rim $b$ of a cup, B', the vertical portion of which is preferably let down through the floor A' of the machine. The bottom of cup B' is formed with a hub, $b'$, through which the distributer-shaft $a$ passes up to receive the hub C of force-wheel C'. This force-wheel C' has arms $C^2$ that radiate from a central rim, $c$, and have themselves downwardly-extending flanges, the lower edges of which just clear the bottom of the cup B' when the wheel is in place in it. The hub of wheel C is keyed to the upper end of shaft $a$, and the wheel is to be revolved by it.

Between the hub C and rim $c$ there are two curved slots, $c'\,c'$, in the wheel C', and these are to admit bolts $d\,d$, by which a gage-plate, D, (shown in perspective in Fig. 5 of the drawings,) is secured to it. This plate D has an outer rim, D', that fits loosely about the wheel C', and the plate proper has slots down through it that conform in outline to the arms $C^2$ of wheel C. A flange, $d'$, projects down from an edge of each slot in advance of it, and down between each of the arms $C^2$. The gage-plate has also an opening in its center that fits over the hub C, and smaller openings to admit the bolts $d$, which latter are secured in place and adjustment by a plate, $d^2$, and thumb-nuts $d^3$. The cup B' is formed with an outlet for the grain in its under side, which consists of two large openings, 1 and 2, connected by a narrow slot, 3, and these lead to a spout, 4, that depends over the distributer, and the annulus B is formed or provided with a plate, $B^4$, that projects over the outlet, but above the line of travel of the force-wheel and gage-plate, the office of plate $B^4$ being to shut the seed from that portion of the force-wheel that is passing over the outlet. The opening 2 in the cup B' is farther from the center than opening 1. The distributer E is carried loosely by shaft $a$, and its hub is provided with beveled teeth that mesh with corresponding bevel-teeth of wheel E' on power-shaft $E^2$. The spokes of wheel E' are concaved, and in this concave a small bevel-pinion, F, is keyed to the end of shaft $E^2$ for mesh with a horizontal bevel-pinion on shaft $a$, by which the latter is driven, the proportionate size of the gearing being such that the distributer will be revolved about ten times as rapidly as the shaft $a$.

The operation of our device is as follows: The grain is poured into the hopper and fills into the opening between each arm and the corresponding flange of the gage-plate, and as the force-wheel and its plate revolve the seed in these openings is carried under plate $B^4$ and over the outlet, the grain in the outer portion falling through opening 2, and that in the inner portion falling through opening 1; and to make this division more accurate we connect the arms C' by vertical partitions $g$ and slot the flanges in the gage-plate, so that they may fit down over them. The capacity of each compartment is gaged by adjusting the gage-plate so that its flanges, each of which forms a wall of a compartment, lie closer to or farther from the flange $d'$ of the adjacent and opposing arm of the force-wheel, permitting this after the screw-nuts have been loosened. The cup B' is held in place by clamps H, and when these are loosened the cup may be turned so as to carry its outlet to the desired position over the distributer to give the desired direction of cast.

of seed in each cast by turning the plate D, and thus expanding or contracting the walls of the compartments between the arms of force-wheel C', this regulation cannot be accomplished with the construction above described except when the machine is at rest, and therefore when we desire to make a machine that can be regulated while in motion we extend the shaft $a$ farther up into the hopper, and, dispensing with plate B⁴ of annulus B, we provide it with an annular shoulder to receive the base-rim M of a cap, M', that is slipped on shaft $a$ in lieu of plate $d^2$. This cap M' is secured in position over shaft $a$ by a set-bolt, $m$, and a portion of its base-rim rests on plate D, and clamps the latter on the force-plate, so that the cap, gage-plate, and force-plate will revolve together. The cap has one or more openings in its side for the admission of seed from the hopper into it, and just at the rear of each opening is a tangential flange, N, that as the cap revolves scoops the seed from the hopper into the cap and thence to the compartments in the force-wheel. N' N' are gates which fit in the openings, and are connected by a cross-bar, O, that has a hub, $h$, fitting down on the shaft. This hub has a groove in its periphery to receive the sleeved fingers of a spanner, I, the opposite end of the arm of which is bent at right angles to and fits on a shaft, I', that is journaled in the side of the hopper at $i$, and the outer end of which carries a crank, I², and travels over a quadrant, $i'$, so that when this crank is turned it will raise or lower the gates, and their height will be indicated by the position of the arm I² on the quadrant, and as the gates work up and down they may be operated equally as well when the machine is in motion as when it is at rest.

We may make the bottom of the cup B' either concave or convex, and shape the force-wheel and gage-plate accordingly, without departing from the spirit of our invention.

Having thus fully described our invention, what we claim as new, and desire to secure by Letters Patent, is—

1. In a seed-sower, a cup forming the bottom of the hopper and having an upper plane horizontal surface and outlet for the seed or fertilizer, in combination with a horizontal force-wheel, having flanged arms, the lower surfaces of which are everywhere above the horizontal upper face of the cup, said force-wheel being adapted to revolve in said cup and carry the seed or fertilizer to the exit-opening in determined quantities, substantially as described.

2. The combination, with the cup, of a force-wheel, its flanged arms, and a gage-plate having flanges, one of which projects down between each pair of the arms of the force-wheel, the lower edges of all parts of said force-wheel and gage being everywhere above the plane horizontal upper face of said cup, as set forth.

3. The cup having an exit, 1 2 3, in combination with the force-wheel and a partition dividing the space between each pair of arms into two compartments, as set forth.

4. In a sower, the combination, with the force-wheel, of a cap, M', adapted to be revolved with it, as set forth.

5. The cap M', having tangential flange or flanges N, in combination with a gage-plate, force-wheel, shaft $a$, and hopper, as set forth.

6. The combination, in a seed-sower, of the cap M', its gate or gates, and crank-arm I², with a lever and connections for adjusting the gate or gates.

7. In a sower, the combination of hopper A and cup B', having seed-outlet, with force-wheel C', having central rim, $c$, and radiating arms C², and the gage-plate D, having outer rim, D', and slots conforming in outline to the said arms C² of the force-wheel, and flanges projecting down from one edge of each slot, in advance of it, between each of the arms C², substantially as set forth.

8. In a sower, the combination of hopper A and cup B', having seed-outlet, with force-wheel C', having central rim, $c$, and radiating arms C², connected by vertical partitions $g$, and the gage-plate D, having slots conforming in outline to the said arms C², and flanges $d'$, projecting down from one edge of each slot, said flanges having vertical slits or slots for the reception of the partitions $g$, substantially as set forth.

9. In a sower, the combination of the shaft $a$, carrying distributer E, cup B', and hopper A, and force-wheel C', the hub of the latter being keyed to said shaft, and the hub of the distributer having beveled teeth meshing with corresponding beveled teeth on wheel E' of power-shaft E², the spokes of said wheel E' being concaved, with which concavity moves a bevel-pinion, F, keyed on said power-shaft, and which meshes with a horizontal bevel pinion on shaft $a$, substantially as set forth.

In testimony that we claim the foregoing we have hereunto set our hands, at Racine, in the county of Racine and State of Wisconsin, in the presence of two witnesses.

HANS AMUNDSON.
FREDERICK J. HENRICHSEN.

Witnesses:
S. S. STOUT,
H. G. UNDERWOOD.